(12) United States Patent
Kawamizu

(10) Patent No.: US 6,722,126 B2
(45) Date of Patent: Apr. 20, 2004

(54) EXHAUST ARRANGEMENT FOR INTERNAL COMBUSTION ENGINE

(75) Inventor: Kiyomi Kawamizu, Kanagawa (JP)

(73) Assignees: Nissan Motor Co., Ltd., Yokohama (JP); Renault s.a.s. societe par actions simplifiee, Billancourt (FR)

( * ) Notice: Subject to any disclaimer, the term of this patent is extended or adjusted under 35 U.S.C. 154(b) by 0 days.

(21) Appl. No.: 10/317,090

(22) Filed: Dec. 12, 2002

(65) Prior Publication Data

US 2003/0131594 A1 Jul. 17, 2003

(30) Foreign Application Priority Data

Jan. 17, 2002 (JP) ........................................ 2002-008129

(51) Int. Cl.⁷ ................................................ F01N 7/00
(52) U.S. Cl. ............................. 60/324; 60/299; 60/323
(58) Field of Search ........................ 60/299, 313, 323, 60/324

(56) References Cited

U.S. PATENT DOCUMENTS

| | | | | |
|---|---|---|---|---|
| 4,484,440 A | * | 11/1984 | Oki et al. ....................... | 60/276 |
| 4,745,742 A | * | 5/1988 | Nada et al. .................... | 60/276 |
| 4,815,274 A | * | 3/1989 | Piatti ............................. | 60/313 |
| 5,867,985 A | * | 2/1999 | Furuhashi et al. ............. | 60/323 |
| 6,018,946 A | * | 2/2000 | Matsumoto .................... | 60/323 |
| 6,082,103 A | * | 7/2000 | Sugiura et al. ................ | 60/323 |
| 6,324,838 B1 | * | 12/2001 | Stempien et al. .............. | 60/323 |
| 6,397,589 B1 | * | 6/2002 | Beson et al. ................... | 60/320 |
| 6,555,070 B1 | * | 4/2003 | Kruger .......................... | 422/179 |
| 6,581,377 B2 | * | 6/2003 | Carlson et al. ................ | 60/323 |

FOREIGN PATENT DOCUMENTS

| | | |
|---|---|---|
| JP | 52-164602 | 12/1977 |
| JP | 63-179142 | * 7/1988 |
| JP | 10-238341 A | 9/1998 |
| JP | 11-294156 A | 10/1999 |
| WO | WO 99/35431 A1 | 7/1999 |

* cited by examiner

Primary Examiner—Thomas Denion
Assistant Examiner—Diem Tran
(74) Attorney, Agent, or Firm—Foley & Lardner (57) ABSTRACT

An exhaust arrangement for a multi-cylinder internal combustion engine of a vehicle which has a row of cylinders. The arrangement includes an exhaust manifold including a branch portion having a plurality of branch pipes corresponding to the cylinders, a catalyst disposed downstream of the exhaust manifold, and an exhaust pipe connecting the exhaust manifold to the catalyst. The exhaust pipe defines an exhaust path having a bend. The bend includes a plane dividing an interior of the bend into equal halves. A partition divides the exhaust path into first and second exhaust passages coextending in a longitudinal direction of the exhaust pipe. The partition extends in the bend in alignment with the plane. An oxygen sensor is disposed at the bend of the exhaust pipe in alignment with the partition and projects into both of the first and second exhaust passages through a periphery of the partition.

20 Claims, 10 Drawing Sheets

EXHAUST ARRANGEMENT FOR INTERNAL COMBUSTION ENGINE

BACKGROUND OF THE INVENTION

The present invention relates to an exhaust arrangement for a multi-cylinder internal combustion engine of a vehicle.

For the purpose of effectively conducting emission control in a vehicle, there is a demand to provide an exhaust arrangement in which a catalyst is disposed near a combustion chamber of an engine in order to early activate the catalyst at a low temperature upon engine starting operation. In a front-engine front-wheel drive vehicle (FF vehicle) including an engine disposed on the right or left side of an engine room, a catalyst is arranged at substantially a central part of the vehicle and along a fore-and-aft direction of the vehicle. Accordingly, in the FF vehicle, an exhaust pipe connecting the engine and the catalyst has a generally crank shape.

On the other hand, there is known an exhaust manifold which includes a branch portion constituted of a plurality of branch pipes corresponding to engine cylinders. The branch pipes are merged into an exhaust collector on the downstream side. An exhaust pipe connects the exhaust collector with a catalyst disposed downstream of the exhaust collector. The exhaust pipe has a two-part split construction in which two separate exhaust passages extend between the exhaust collector and the catalyst. There is a demand for elongating the two exhaust passages in order to reduce the number of engine revolution required for avoiding the exhaust interference among the engine cylinders.

Figure 10:
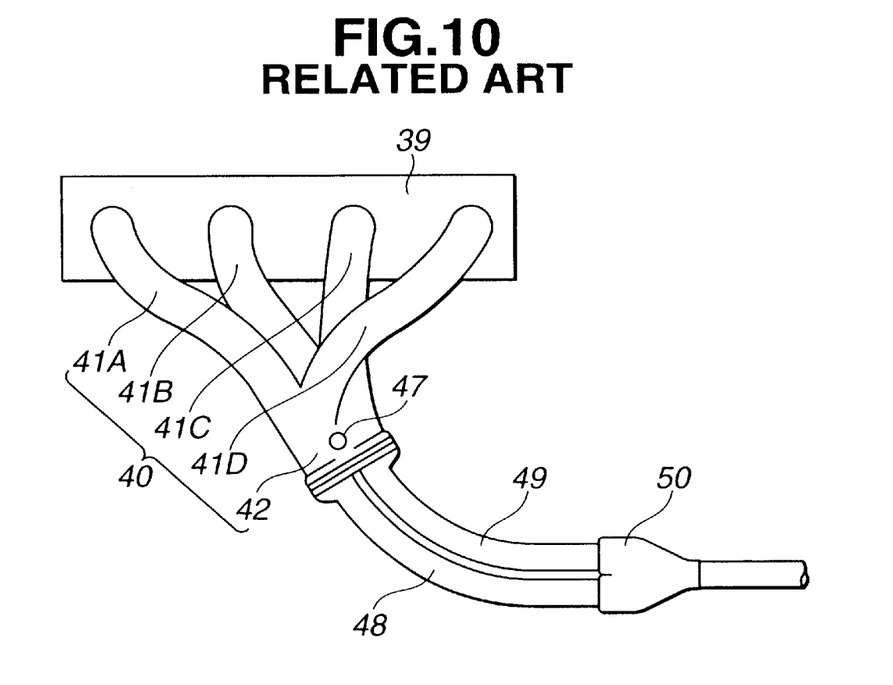
FIG. 10 is a diagram showing an exhaust arrangement of a related art.
Figure 11:
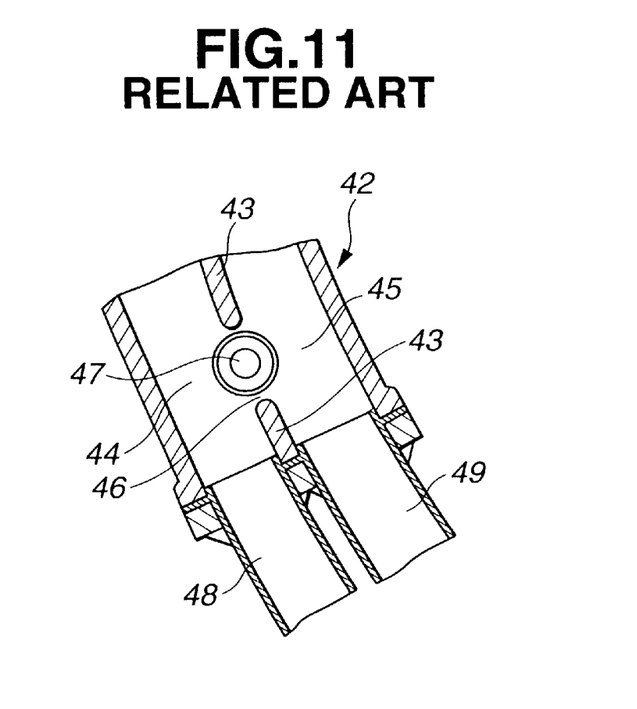
FIG. 11 is a sectional view of a sensor mount of the exhaust arrangement shown in FIG. 10, to which an oxygen sensor is mounted.

Japanese Utility Model Application First Publication No. 52-164602 discloses an exhaust arrangement in which two separate exhaust passages are provided. FIGS. 10 and 11 show such an exhaust arrangement as described in this related art. As shown in FIG. 10, exhaust manifold 40 including four branch pipes 41A–41D corresponding to engine cylinders of engine 39, and exhaust collector 42 connected with downstream portions of branch pipes 41A–41D. Exhaust collector 42 is coupled to first and second exhaust pipes 48 and 49 which are joined together at combined portion 50. As illustrated in FIG. 11, partition wall 43 is disposed within exhaust collector 42 and divides an exhaust path within exhaust collector 42 into first and second exhaust passages 44 and 45. Branch pipes 41A and 41D are communicated with first exhaust passage 44, and branch pipes 41B and 41C are communicated with second exhaust passage 45. Partition wall 43 has notch 46 in which oxygen sensor 47 is arranged to face an interior of each of first and second exhaust passages 44 and 45. Oxygen sensor 47 detects an oxygen content in exhaust flowing in each of first and second exhaust passages 44 and 45. First and second exhaust passages 44 and 45 are communicated with exhaust passages within first and second exhaust pipes 48 and 49. The exhaust passages within first and second exhaust passages 44 and 45 are merged into a single exhaust passage via combined portion 50.

SUMMARY OF THE INVENTION

In the related art described above, exhaust collector 42 as well as partition 43 are curved. Exhaust collector 42 has an outside curving portion with a longer curve length and an inside curving portion with a shorter curve length about a center of curvature. Partition wall 43 is similarly curved and has opposed surfaces perpendicular to a direction of a row of the engine cylinders. When viewed in FIG. 11, partition wall 43 is perpendicular to a sheet plane of FIG. 11. Similar to exhaust collector 42, the opposed surfaces of partition wall 43 respectively form outside and inside curving portions with respect to a center of curvature. Oxygen sensor 47 is disposed in notch 46 formed in partition 43 so as to be exposed an interior of each of first and second exhaust passages 44 and 45. The exhaust flowing from the engine cylinders into first and second exhaust passages 44 and 45 gathers at the outside curving portion of exhaust collector 42 and the outside curving portion of partition wall 43. Namely, the exhaust flowing in each of first and second exhaust passages 44 and 45 is concentrated at the respective outside curving portions of exhaust collector 42 and partition wall 43. Therefore, the exhaust flowing in first exhaust passage 44 cannot be efficiently directed toward oxygen sensor 47 as compared with the exhaust flowing in second exhaust passage 45. This leads to inaccurate detection of the oxygen content in the exhaust flowing in first and second exhaust passages 44 and 45.

It would be therefore desirable to provide an exhaust arrangement for an internal combustion engine, in which both emission control and output performance of the engine can be improved.

In one aspect of the present invention, there is provided an exhaust arrangement for a multi-cylinder internal combustion engine of a vehicle, the engine including a row of cylinders, the exhaust arrangement comprising:

an exhaust manifold including a branch portion including a plurality of branch pipes corresponding to the cylinders;

a catalyst disposed downstream of the exhaust manifold;

an exhaust pipe connecting the exhaust manifold to the catalyst, the exhaust pipe defining an exhaust path;

a bend formed in the exhaust pipe, the bend including a plane which divides an interior of the bend into equal halves;

a partition dividing the exhaust path into first and second exhaust passages coextending in a longitudinal direction of the exhaust pipe, the partition extending in the bend in alignment with the plane; and an oxygen sensor disposed at the bend of the exhaust pipe in alignment with the partition, the oxygen sensor projecting into both of the first and second exhaust passages through a periphery of the partition.

In a further aspect of the present invention, there is provided an exhaust arrangement for a multi-cylinder internal combustion engine of a vehicle, the engine including a row of cylinders, the exhaust arrangement comprising:

an exhaust manifold including a branch portion including a plurality of branch pipes corresponding to the cylinders;

a catalyst disposed downstream of the exhaust manifold;

passage means for defining an exhaust path having a length extending from the exhaust manifold to the catalyst;

bending means for bending the exhaust path to provide the exhaust path with a curve;

partition means for dividing the exhaust path into first and second exhaust passages coextending along the length of the exhaust path, the partition means equalizing the first and second exhaust passages at the curve; and a sensor projecting into both of the first and second exhaust passages at the curve through the partition means.

In a still further aspect of the present invention, there is provided an exhaust arrangement for a multi-cylinder internal combustion engine of a vehicle, the engine including a row of cylinders, the exhaust arrangement comprising:

an exhaust manifold including a branch portion including a plurality of branch pipes corresponding to the cylinders;

a catalyst disposed downstream of the exhaust manifold;

an exhaust pipe connecting the exhaust manifold to the catalyst, the exhaust pipe defining an exhaust path, the exhaust pipe having a longitudinal axis;

a bend formed in the exhaust pipe, the bend including a plane in which the longitudinal axis of the exhaust pipe lies, the bend including an inner curving periphery and an outer curving periphery extending longer than the inner curving periphery;

a partition dividing the exhaust path into first and second exhaust passages, the partition extending in the bend in alignment with the plane; and an oxygen sensor disposed at the outer curving periphery of the bend in alignment with the partition, the oxygen sensor projecting into both of the first and second exhaust passages through a periphery of the partition.

DETAILED DESCRIPTION OF THE PREFERRED EMBODIMENT

Figure 1:
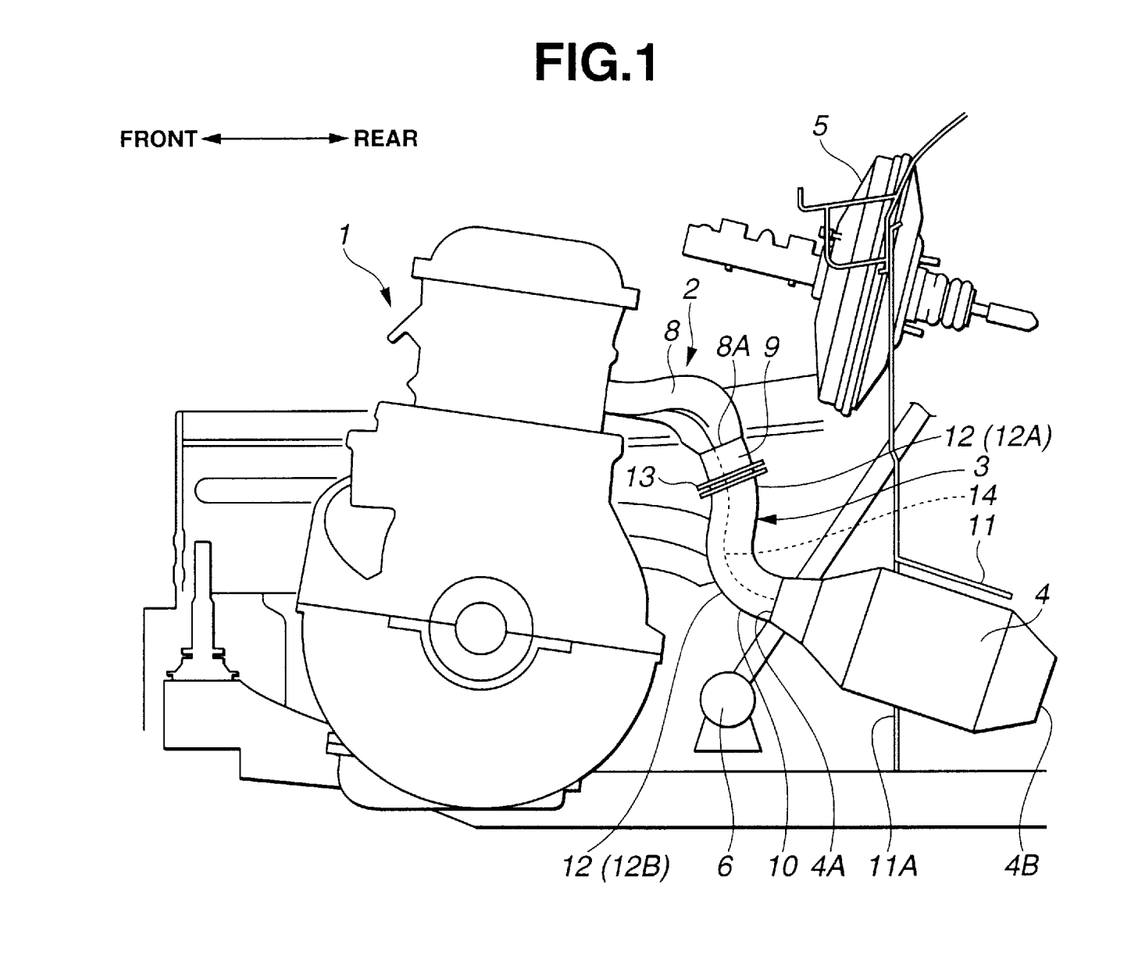
FIG. 1 is a side view of an exhaust arrangement in an internal combustion engine, according to a first embodiment of the present invention.
Figure 2:
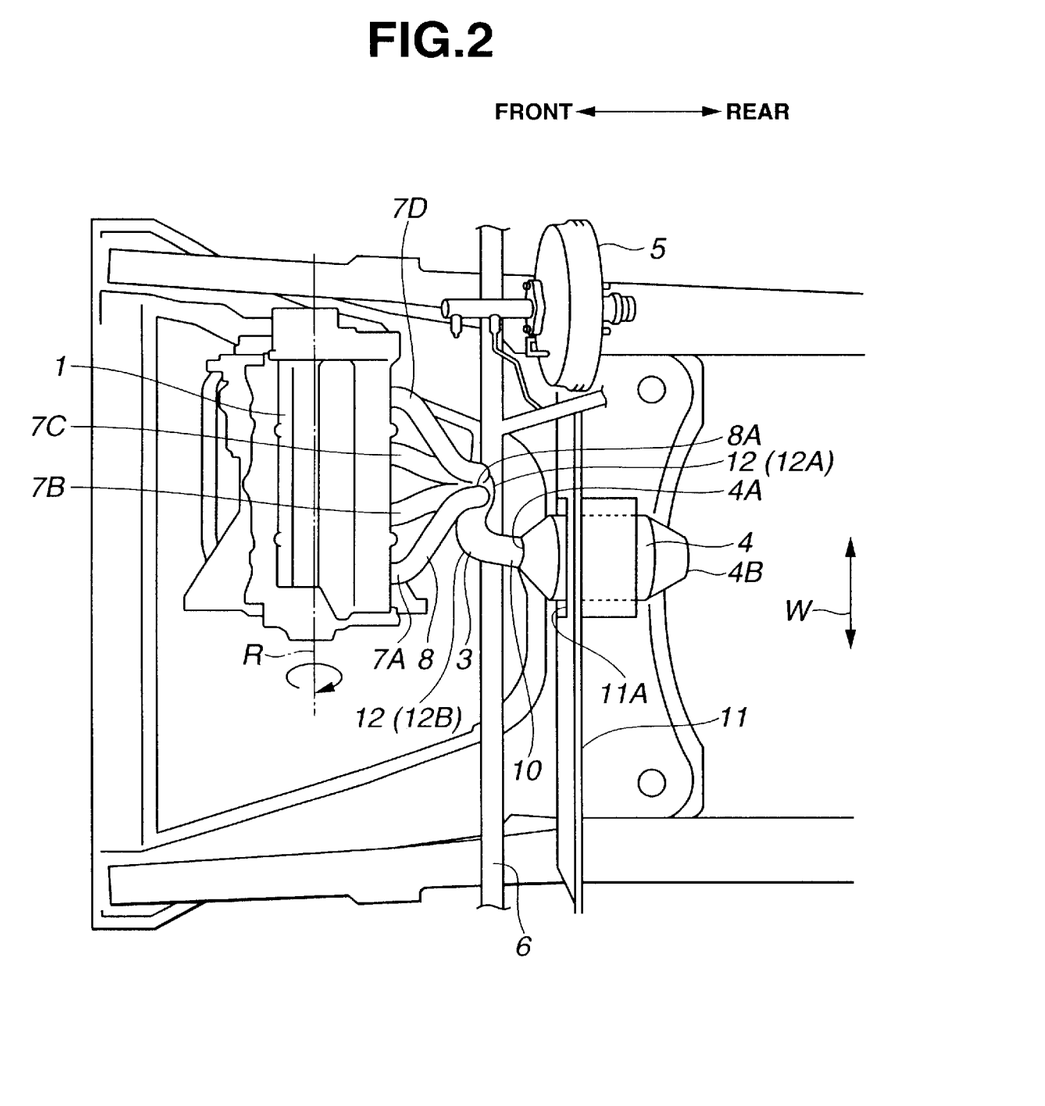
FIG. 2 is a top plan view of the exhaust arrangement shown in FIG. 1.

Referring now to FIGS. 1–7, an exhaust arrangement for a multi-cylinder internal combustion engine of a vehicle, according to a first embodiment of the present invention, is explained. FIGS. 1–2 show a front portion of a front-engine front-wheel drive vehicle (FF vehicle) to which the exhaust arrangement of the present invention is applied. In this embodiment, the internal combustion engine is an in-line four-cylinder engine (hereinafter referred to merely as an engine). Engine 1 is disposed on the right side of an engine room and located in a lateral position in which the four engine cylinders are arranged in a row in a lateral or width direction of the vehicle which extends perpendicular to a fore-and-aft or length direction thereof. An exhaust path extends from a rear end of engine 1 in a rearward direction of the vehicle.

Figure 4:
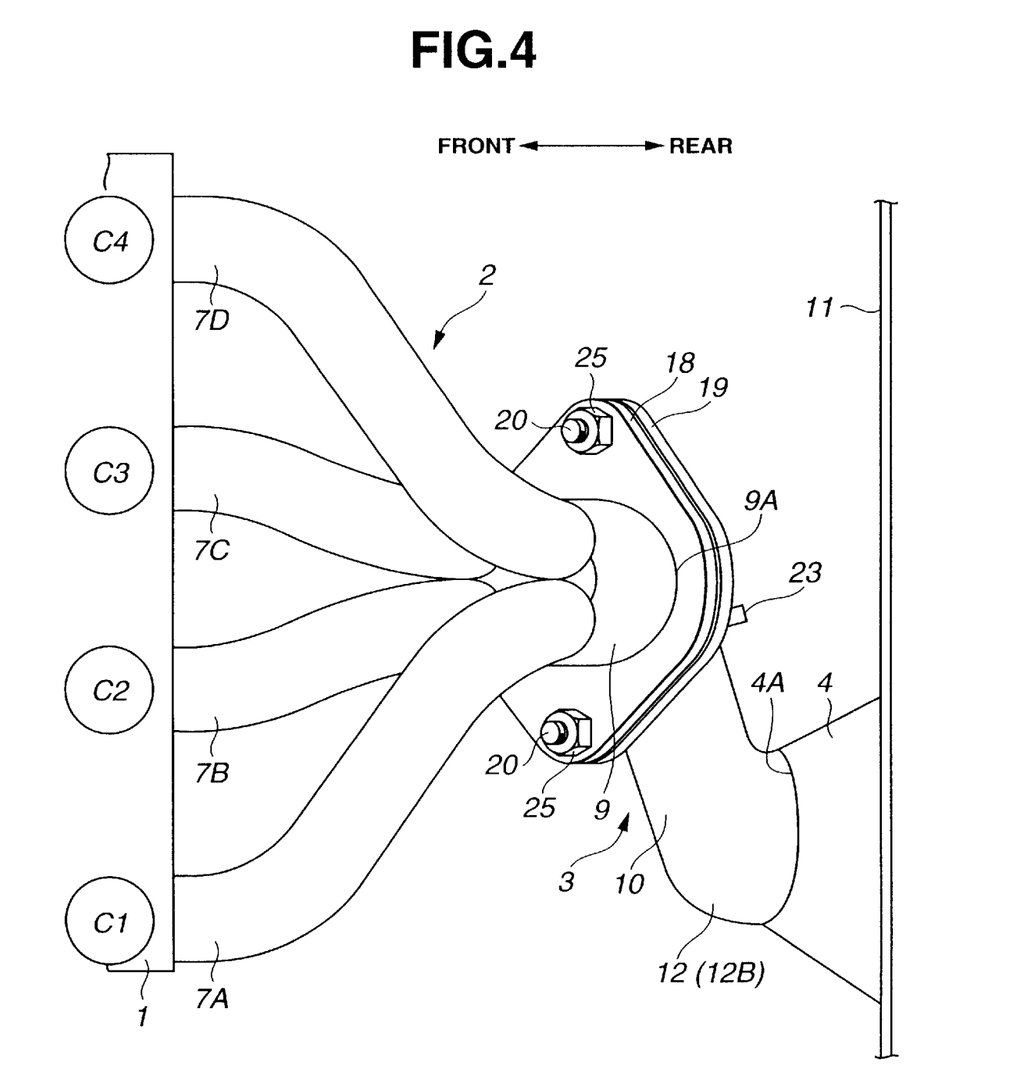
FIG. 4 is a top plan view of the essential part of the exhaust arrangement.
Figure 5:
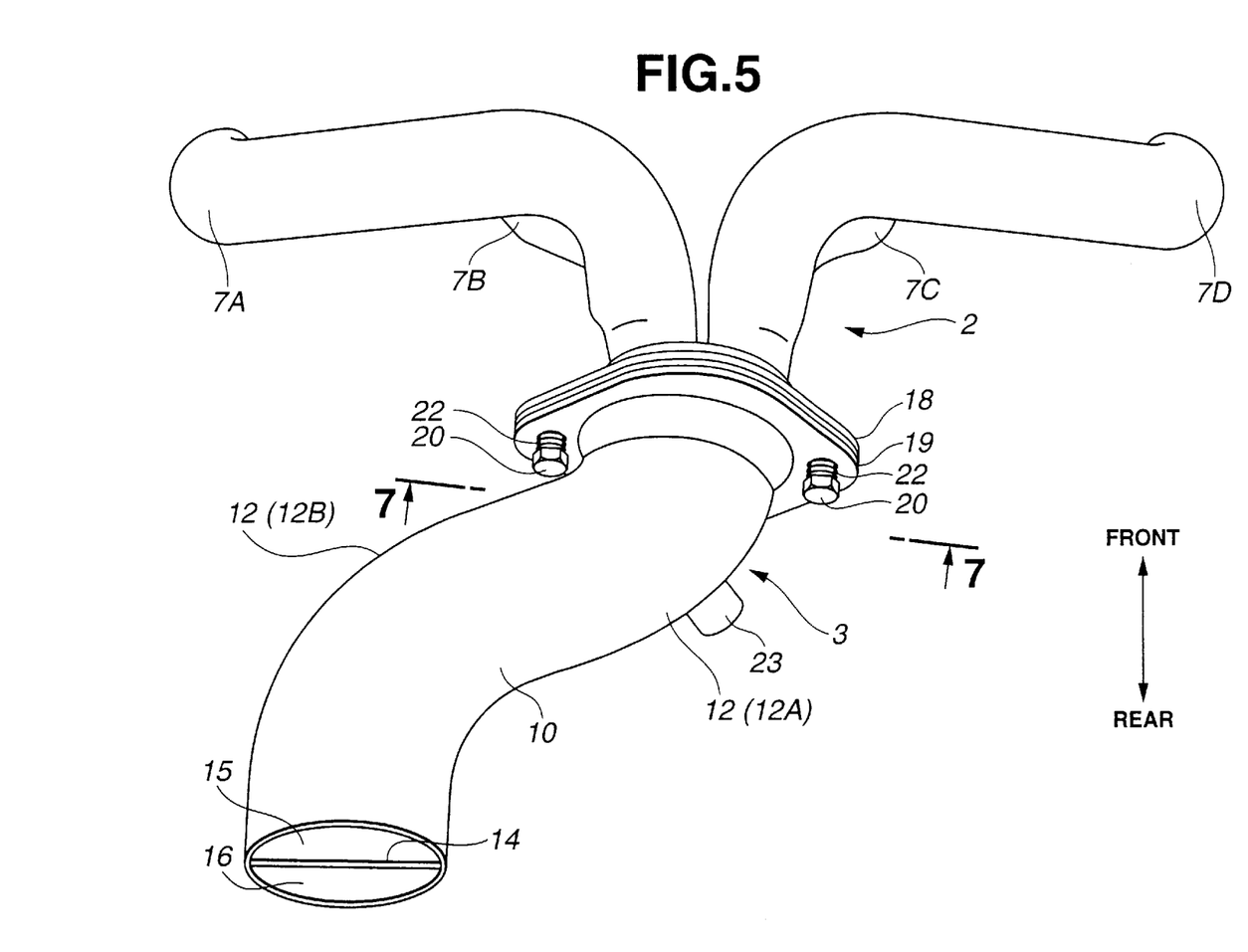
FIG. 5 is a perspective view of the essential part of the exhaust arrangement.

Exhaust manifold 2 coupled to engine 1 is connected with catalyst 4 via exhaust pipe 3. In FIGS. 1–2, reference numerals 5 and 6 denote a master back and a steering rack, respectively. Exhaust manifold 2 includes branch portion 8 which has four branch pipes 7A–7D correspond to the four cylinders of engine 1 as shown in FIG. 4. Branch portion 8 has downstream end portion 8A at which four branch pipes 7A–7D are converged as shown in FIG. 2. Downstream end portion 8A is located at a position rearward offset from substantially a central portion of a width of engine 1 which extends in a direction of the row of the four cylinders. The cylinder-row direction is indicated at W in FIG. 2, and substantially aligned with a lateral direction of the vehicle extending perpendicular to the fore-and-aft direction thereof.

As illustrated in FIG. 1, catalyst 4 is located on a rear side of engine 1 and at a height lower than engine 1. Catalyst 4 is arranged such that a longitudinal direction thereof is substantially aligned with the fore-and-aft direction of the vehicle. Catalyst 4 is placed in an inclined state in which upstream end 4A thereof is located at a height higher than downstream end 4B thereof. Catalyst 4 projects rearward from tunnel 11A of dash panel 11 disposed on the rear side of engine 1. Tunnel 11A is located at a height lower than engine 1. As illustrated in FIG. 2, tunnel 11A is formed in substantially a central portion of dash panel 11 in the lateral direction of the vehicle.

Figure 3:
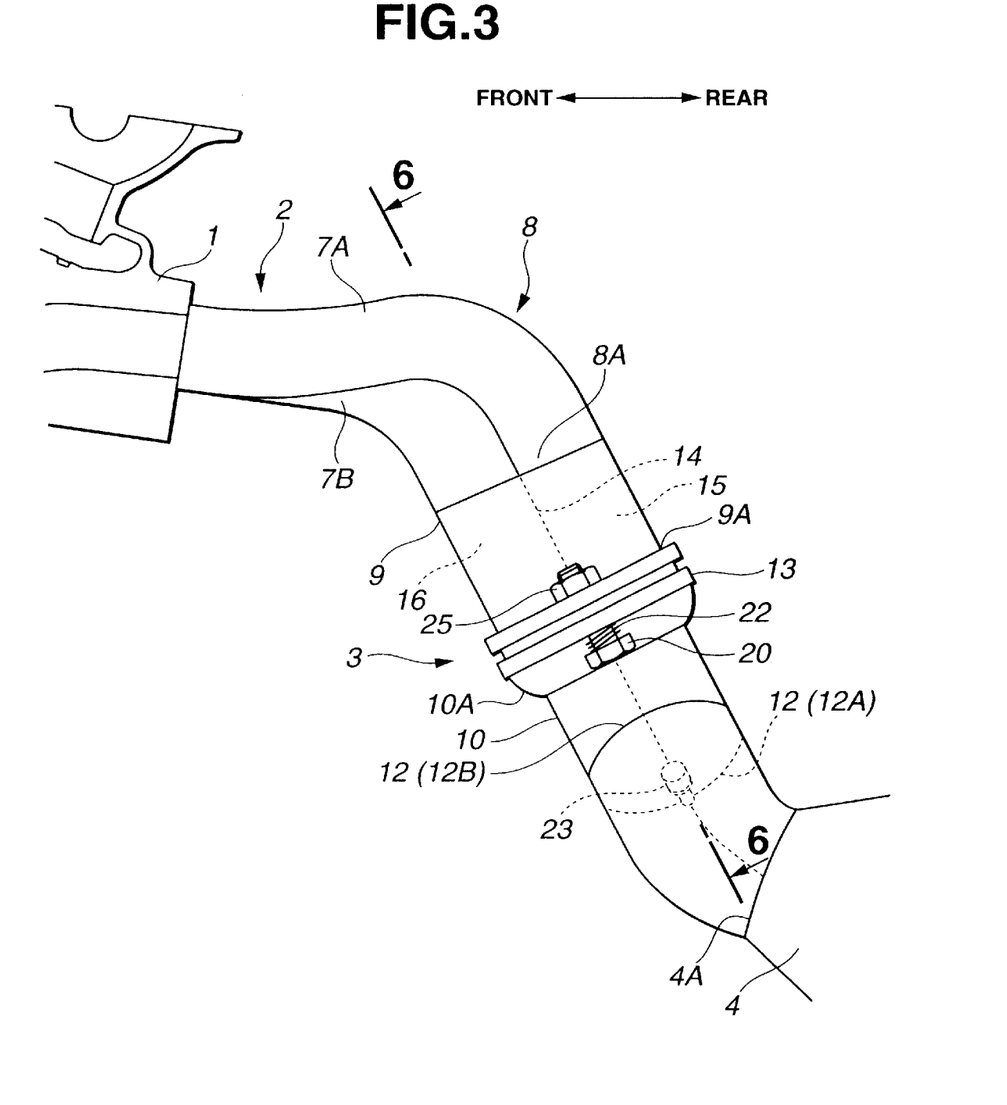
FIG. 3 is an enlarged diagram showing an essential part of the exhaust arrangement.

Exhaust pipe 3 defines the exhaust path having a length extending between exhaust manifold 2 and catalyst 4. Exhaust pipe 3 has bend 12 to thereby be formed into a generally crank shape. Bend 12 forms a curve in the exhaust path. In this embodiment, exhaust pipe 3 has two bends 12, namely, first bend 12A and second bend 12B which are disposed on an upstream side of exhaust pipe 3 and a downstream side thereof, respectively. Exhaust pipe 3 extends rearward from downstream end portion 8A of branch portion 8 of exhaust manifold 2 in a slanting downward direction. As illustrated in FIG. 2, exhaust pipe 3 is bent at first bend 12A toward the left side of the vehicle along the lateral direction of the vehicle. Exhaust pipe 3 is then bent at second bend 12B toward the rear side of the vehicle and connected with catalyst 4. Second bend 12B is located at substantially a central portion of the vehicle in the lateral direction of the vehicle. Partition 14 is disposed within exhaust pipe 3. Partition 14 extends along the curve of exhaust pipe 3 over substantially an entire length of exhaust pipe 3. As illustrated in FIG. 3, partition 14 divides the exhaust path into first exhaust passage 15 and second exhaust passage 16 coextending in a longitudinal direction of exhaust pipe 3.

Exhaust manifold 2 and exhaust pipe 3 will be in detail explained hereinafter. As best shown in FIG. 3, exhaust pipe 3 includes exhaust collector 9 and exhaust tube 10. Exhaust collector 9 has an upstream end portion connected with downstream end portion 8A of branch portion 8. First and second bends 12A and 12B are formed in upstream and downstream portions of exhaust tube 10, respectively. Each of first and second bends 12A and 12B has a plane dividing an interior of each of first and second bends 12A and 12B into equal halves. The plane contains a longitudinal axis of exhaust pipe 3. In the case of exhaust pipe 3 having a section of a symmetrical shape such as circle, ellipse, rectangle and the like, the longitudinal axis is regarded as a center axis. Partition 14 extends in first and second bends 12A and 12B in alignment with the plane. Namely, first and second exhaust passages 15 and 16 are equalized at first and second bends 12A and 12B. The plane is substantially parallel to rolling axis R, shown in FIG. 2, of engine 1 about which engine 1 is rollable. Partition 14 also is substantially parallel to rolling axis R of engine 1. With the arrangement of partition 14, first exhaust passage 15 is located rearward of second exhaust passage 16.

Figure 6:
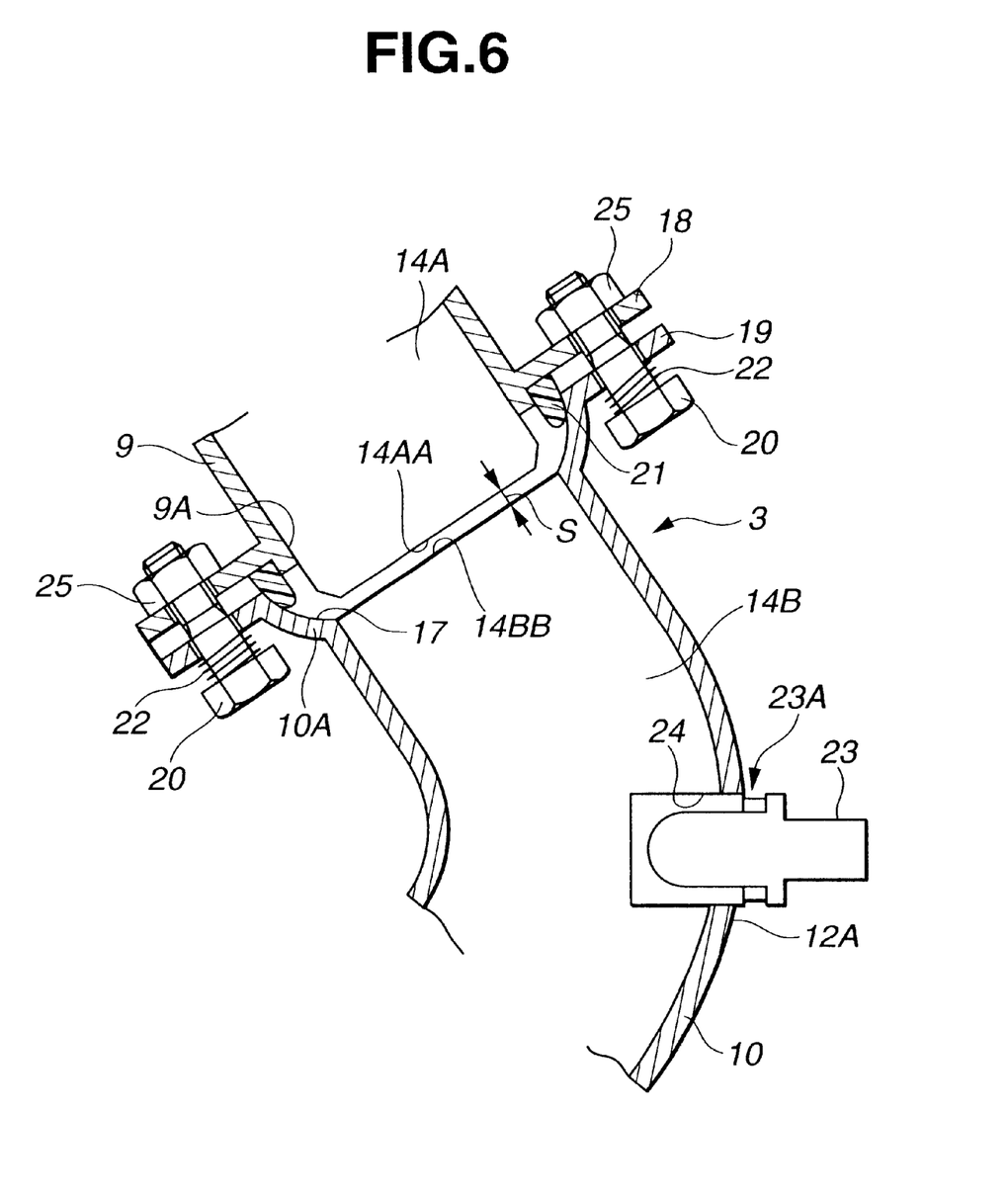
FIG. 6 is a sectional view, taken along line 6—6, of the exhaust arrangement of FIG. 3.
Figure 7:
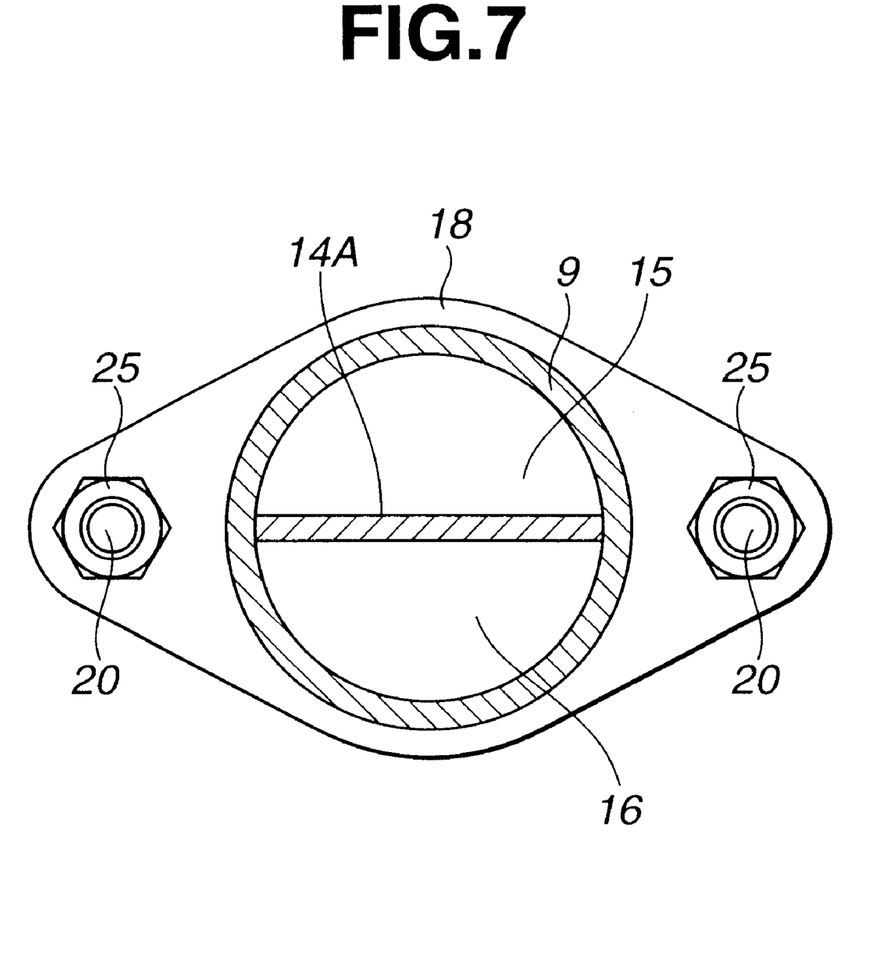
FIG. 7 is a sectional view, taken along line 7—7, of the exhaust arrangement of FIG. 5.

As illustrated in FIG. 6, partition 14 is in the form of a plate and constituted of upstream partition 14A and downstream partition 14B which are disposed within exhaust collector 9 and exhaust tube 10, respectively. Upstream partition 14A divides an upstream portion of the exhaust path into equal halves, namely, into upstream portions of respective first and second exhaust passages 15 and 16. FIG. 7 shows first and second exhaust passages 15 and 16 formed within exhaust collector 9. Downstream partition 14B divides a downstream portion of the exhaust path into equal halves, namely, into downstream portions of respective first and second exhaust passages 15 and 16. Upstream and downstream partitions 14A and 14B are substantially parallel to rolling axis R of engine 1. As seen from FIGS. 3–5, first exhaust passage 15 is communicated with exhaust passages defined by branches 7A and 7D connected to cylinders C1 and C4. Second exhaust passage 16 is communicated with exhaust passages defined by branches 7B and 7C connected to cylinders C2 and C3.

As illustrated in FIGS. 3 and 6, exhaust collector 9 and exhaust tube 10 are connected with each other by means of spherical joint 13, bolts 20 and nuts 25. As shown in FIGS. 4 and 6, exhaust collector 9 includes first flange 18 radially outward extending from an outer periphery of downstream end portion 9A. Exhaust tube 10 includes second flange 19 radially outward extending from an outer periphery of upstream end portion 10A. Spherical joint 13 is disposed between first and second flanges 18 and 19.

As illustrated in FIG. 6, spherical joint 13 includes spherical bearing surface 17 formed on an inner circumferential surface of upstream end portion 10A of exhaust tube 10. Spherical bearing surface 17 is spaced apart from a distal end face of downstream end portion 9A of exhaust collector 9. Spherical joint 13 also includes annular seal 21 fitted onto a shoulder of downstream end portion 9A. The shoulder is formed by an outer circumferential surface of downstream end portion 9A and a downstream side surface of first flange 18 which encounters with the outer circumferential surface of downstream end portion 9A. Annular seal 21 has inner and outer circumferential surfaces which are contacted with the outer circumferential surface of downstream end portion 9A and spherical bearing surface 17 of upstream end portion 10A, respectively. Annular seal 21 has an upstream end face contacted with the downstream side surface of first flange 18. Owing to the contact with first flange 18, annular seal 21 is prevented from being displaced toward an upstream side of exhaust collector 9. First and second flanges 18 and 19 are formed with bolt holes through which bolts 20 extend into first and second flanges 18 and 19. The bolt holes have a diameter larger than a shaft portion of each of bolts 20. Coil spring 22 is installed between second flange 19 and a head of each of bolts 20 in such a manner that coil spring 22 is wound about the shaft portion of bolt 20.

Upstream partition 14A and downstream partition 14B are spaced from each other in alignment relation at the connection between exhaust collector 9 and exhaust tube 10 at which spherical joint 13 is provided. Downstream end face 14AA of upstream partition 14A and upstream end face 14BB of downstream partition 14B extend in a parallel and spaced relation to each other to define space S therebetween. Space S is set at 1.5 mm in this embodiment.

Oxygen sensor 23 is disposed at first bend 12A of exhaust tube 10 in alignment with downstream partition 14B. Specifically, first bend 12A includes an inner curving periphery and an outer curving periphery extending longer than the inner curving periphery about a center of curvature. In other words, a radius of curvature of the outer curving periphery is larger than that of the inner curving periphery. In FIG. 6, the inner curving periphery is on the left side of first bend 12A, and the outer curving periphery is on the right side thereof. Therefore, the curves of the exhaust path has an inner curve portion and an outer curve portion which correspond to the inner curving periphery and the outer curving periphery of first bend 12A, respectively. Oxygen sensor 23 is installed to sensor mount 23A disposed at the outer curving periphery of first bend 12A and projects into the outer curve portion of the curve of the exhaust path. Sensor mount 23A includes a mount hole formed in the outer curving periphery of first bend 12A, and notch 24 formed in a periphery of downstream partition 14B which is connected with the outer curving periphery of first bend 12A. Notch 24 is communicated with the mount hole. Notch 24 has a size corresponding to oxygen sensor 23 and receives oxygen sensor 23 therein. Oxygen sensor 23 projects into both of first and second exhaust passages 15 and 16 through notch 24. When exhaust gas from engine 1 flows into exhaust tube 10, the exhaust gas is concentrated to the side of the outer curving periphery of first bend 12A and flows along an inside surface of the outer curving periphery thereof which defines a part of each of first and second exhaust passages 15 and 16. Oxygen sensor 23 is exposed to the exhaust gas flowing in each of first and second exhaust passages 15 and 16.

As is appreciated from the above description, generally crank-shaped exhaust pipe 3 having first and second bends 12A and 12B can have an increased length required for reducing the engine revolution in order to prevent the occurrence of exhaust interference among engine cylinders C1–C4. This enhances a performance of engine output, especially, the output performance upon low speed operation of engine 1.

With the arrangement of partition 14 extending over substantially the entire length of exhaust pipe 3, the lengths of first and second exhaust passages 15 and 16 can be set to a maximum. This effectively improves the performance of engine output during low speed operation of engine 1.

Further, with the arrangement of oxygen sensor 23 at the outer curving periphery of first bend 12A, oxygen sensor 23 can be efficiently exposed to the exhaust gas flowing in each of first and second exhaust passages 15 and 16 and can more accurately detect an oxygen content in the exhaust gas. The oxygen content in the exhaust gas emitted from all of engine cylinders C1–C4 can be detected using a single oxygen sensor. This can serve for reducing the production cost of the exhaust arrangement. Further, since the size of notch 24 at sensor mount 23A is determined corresponding to oxygen sensor 23, turbulence of the exhaust gas within notch 24 which is caused by communication between first and second exhaust passages 15 and 16 via notch 24, can be reduced to a minimum.

Further, as explained above, engine 1 is arranged in the position in which the direction of the row of cylinders C1–C4 extends along the lateral direction of the vehicle. This can reduce the length of the exhaust path, serving for suppressing emission. Further, the upstream end portion of exhaust collector 9 is located at the position rearward offset from substantially the central portion of engine 1. First exhaust passage 15 is communicated with the passages of first and fourth branch pipes 7A and 7D, and second exhaust passage 16 is communicated with the passages of second and third branch pipes 7B and 7C. With the arrangement, the lengths of the respective exhaust paths extending from cylinders C1–C4 to catalyst 4 can be substantially equal to each other. As a result, pulsation noise caused during the suction and exhaust operation of engine 1 can be reduced. Volumetric efficiency of each of cylinders C1–C4 and an amount of residual gas therein can be rendered uniform, so that output of engine 1 can be enhanced.

Upstream and downstream partitions 14A and 14B forming partition 14 divide the exhaust path in exhaust pipe 3 into first and second exhaust passages 15 and 16 equal in volumetric capacity. First and second exhaust passages 15 and 16, therefore, can be equal in flow resistance. This equalizes volumetric efficiency of each of cylinders C1–C4 and an amount of residual gas therein during high speed operation of engine 1, serving for improving engine output during the high speed operation. Further, exhaust interference caused among cylinders C1–C4 can be at the same level, so that volumetric efficiency of each of cylinders C1–C4 and an amount of residual gas therein can be rendered uniform during medium and low speed operation of engine 1. This attains enhancement of engine output during the medium and low speed operation.

Further, vibration caused due to the rolling of engine 1 can be absorbed by spherical joint 13 which is arranged at the connection of exhaust collector 9 and exhaust tube 10. This can avoid occurrence of a gap at the connection of exhaust collector 9 and exhaust tube 10, serving for preventing the exhaust gas flowing in the connection from leaking out from the gap.

Furthermore, with the provision of space S between downstream end face 14AA of upstream partition 14A and upstream end face 14BB of downstream partition 14B, vibration caused due to rolling of engine 1 can be absorbed and errors in dimension of parts of the exhaust arrangement can be adjusted. This serves for avoiding interference of downstream end face 14AA and upstream end face 14BB. Space S can be reduced to such an extent to minimize a volume of a communication passage formed by space S which communicates first and second exhaust passages 15 and 16. This serves for reducing interference of the exhaust gas which is caused between first and second exhaust passages 15 and 16 via the communication passage.

Further, catalyst 4 is located at substantially the central portion of the vehicle in the lateral direction of the vehicle, whereby a layout of components, such as pedals, located within a driver's compartment can be freely designed in both of vehicles having a right steering wheel and a left steering wheel, respectively. In addition, with the arrangement of catalyst 4, in which the longitudinal direction thereof extends along the fore-and-aft direction of the vehicle and catalyst 4 is inclined such that upstream end 4A is placed at the position higher than downstream end 4B in the vertical direction of the vehicle, the exhaust path can be diverted from steering rack 6 to thereby allow a smooth flow of the exhaust gas.

Figure 8:
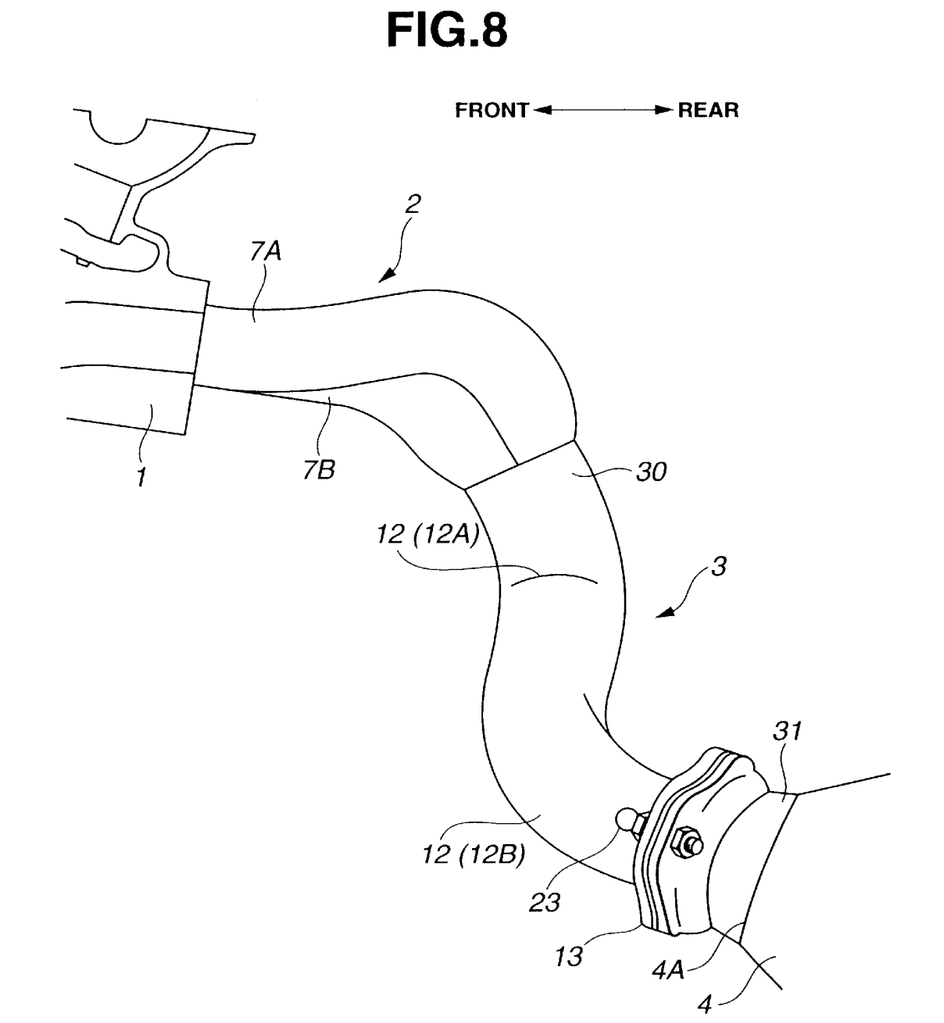
FIG. 8 is a diagram showing the exhaust arrangement according to a second embodiment of the present invention.
Figure 9:
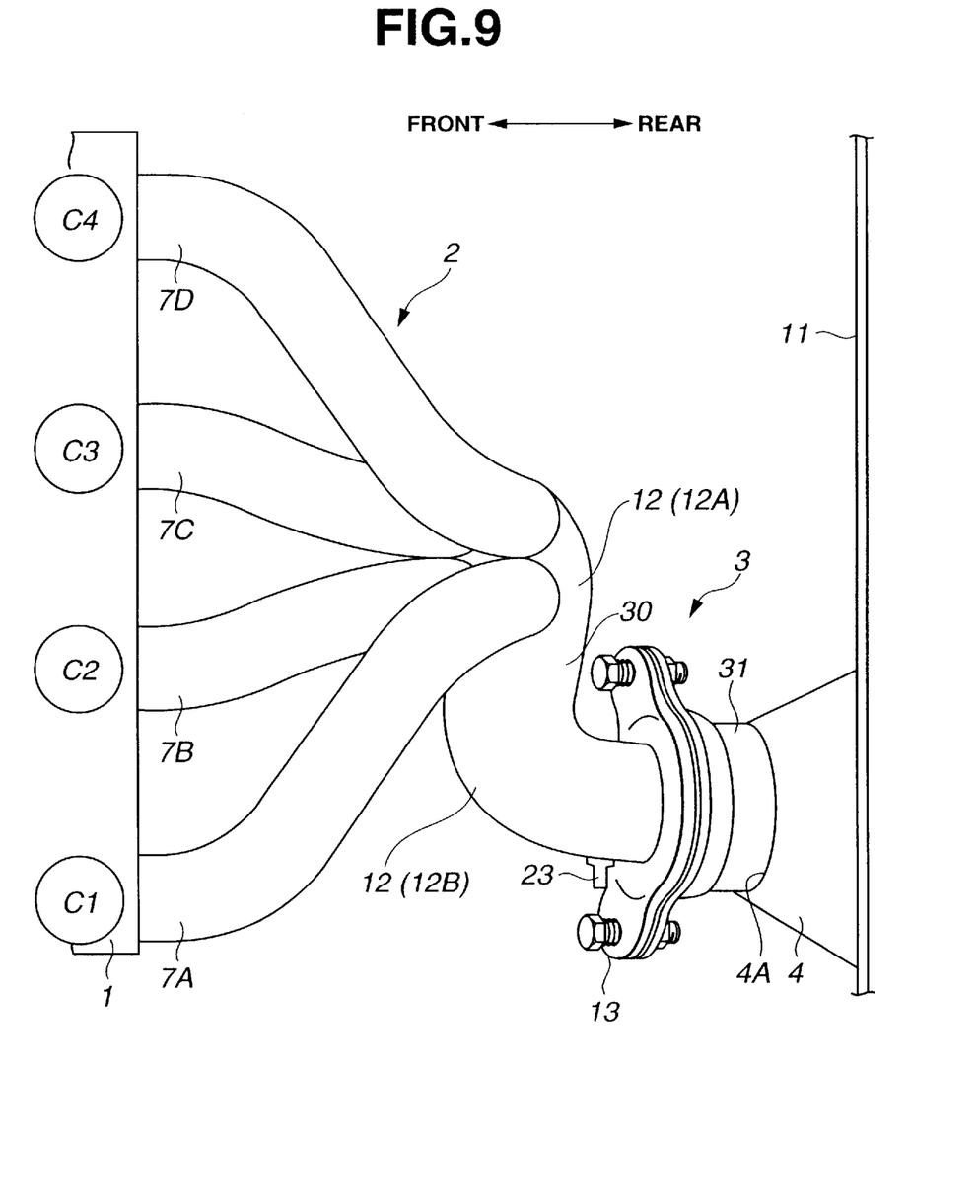
FIG. 9 is a view similar to FIG. 4, but showing the exhaust arrangement according to the second embodiment of the present invention.

Referring to FIGS. 8 and 9, a second embodiment of the exhaust arrangement will be explained hereinafter, which differs in arrangement of bends 12A and 12B of exhaust pipe 3, oxygen sensor 23 and spherical joint 13, from the first embodiment. Like reference numerals denote like parts, and therefore, detailed explanations therefor are omitted. Exhaust pipe 3 has the generally crank-shape as described in the first embodiment but includes exhaust collector 30 having first bend 12A and second bend 12B and exhaust tube 31 coupled with exhaust collector 30 via spherical joint 13. Spherical joint 13 is disposed on the downstream side of second bend 12B. Oxygen sensor 23 is arranged at the outer curving periphery of second bend 12B. The exhaust arrangement of the second embodiment can perform the same effects as explained in the first embodiment.

This application is based on prior Japanese Patent Application No. 2002-8129 filed on Jan. 17, 2002, the entire content of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An exhaust arrangement for a multi-cylinder internal combustion engine of a vehicle, the engine including a row of cylinders, the exhaust arrangement comprising:
   an exhaust manifold including a branch portion including a plurality of branch pipes corresponding to the cylinders;
   a catalyst disposed downstream of the exhaust manifold;
   an exhaust pipe connecting the exhaust manifold to the catalyst, the exhaust pipe defining an exhaust path;
   a bend formed in the exhaust pipe, the bend including a plane which divides an interior of the bend into equal halves;
   a partition dividing the exhaust path into first and second exhaust passages coextending in a longitudinal direction of the exhaust pipe, the partition extending in the bend in alignment with the plane; and
   an oxygen sensor disposed at the bend of the exhaust pipe in alignment with the partition, the oxygen sensor projecting into both of the first and second exhaust passages through a periphery of the partition.

2. The exhaust arrangement as claimed in claim 1, wherein the bend comprises an inner curving periphery and an outer curving periphery extending longer than the inner curving periphery, the inner and outer curving peripheries being spaced from and opposed to each other, the oxygen sensor being disposed at the outer curving periphery.

3. The exhaust arrangement as claimed in claim 1, wherein the partition is in the form of a plate, the partition including a sensor mount to which the oxygen sensor is mounted, the sensor mount being a notch formed in the periphery of the partition.

4. The exhaust arrangement as claimed in claim 1, wherein the partition extends over substantially an entire length of the exhaust pipe.

5. The exhaust arrangement as claimed in claim 1, wherein the internal combustion engine is an in-line engine including an exhaust path extending rearward from the engine, the in-line engine being arranged such that a direction of the row of engine cylinders extends along a lateral direction of the vehicle which extends perpendicular to a fore-and-aft direction thereof.

6. The exhaust arrangement as claimed in claim 1, wherein the exhaust pipe comprises an exhaust collector connected to a downstream end portion of the branch portion of the exhaust manifold, and an exhaust tube connecting the exhaust collector to the catalyst, the exhaust collector and the exhaust tube being connected with each other via a spherical joint.

7. The exhaust arrangement as claimed in claim 6, wherein the partition comprises upstream and downstream partitions separated from each other with a space at the connection between the exhaust collector and the exhaust tube, the upstream and downstream partitions being substantially parallel to a rolling axis of the engine about which the engine is rollable, the upstream and downstream partitions being disposed within the exhaust collector and the exhaust tube, respectively.

8. The exhaust arrangement as claimed in claim 6, wherein the internal combustion engine comprises a in-line four-cylinder engine including first, second, third and fourth cylinders, the first exhaust passage being communicated with the first and fourth cylinders, the second exhaust passage being communicated with the second and third cylinders, the branch pipes being merged at the downstream end portion of the branch portion of the exhaust manifold, the downstream end portion of the branch portion being located at a position rearward offset from substantially a central portion of a width of the engine which extends in a direction of the row of the cylinders.

9. The exhaust arrangement as claimed in claim 8, wherein the partition comprises an upstream partition and a downstream partition which are disposed within the exhaust collector and the exhaust tube, respectively, the upstream and downstream partitions dividing the respective exhaust paths within the exhaust collector and the exhaust tube into equal halves, the upstream and downstream partitions being substantially parallel to a rolling axis of the engine about which the engine is rollable.

10. The exhaust arrangement as claimed in claim 6, wherein the catalyst is located at substantially a central portion of the vehicle in a lateral direction of the vehicle which extends perpendicular to a fore-and-aft direction thereof.

11. The exhaust arrangement as claimed in claim 6, wherein the catalyst is arranged such that a longitudinal direction thereof extends along a fore-and-aft direction of the vehicle, the catalyst including an upstream end connected with the exhaust tube and a downstream end on an opposite side of the upstream end, the catalyst being placed at an inclined state in which the upstream end is located at a height higher than the downstream end in a vertical direction of the vehicle.

12. The exhaust arrangement as claimed in claim 1, wherein the bend comprises a plurality of bends, the oxygen sensor being disposed at one of the plurality of bends.

13. An exhaust arrangement for a multi-cylinder internal combustion engine of a vehicle, the engine including a row of cylinders, the exhaust arrangement comprising:

an exhaust manifold including a branch portion including a plurality of branch pipes corresponding to the cylinders;

a catalyst disposed downstream of the exhaust manifold;

passage means for defining an exhaust path having a length extending from the exhaust manifold to the catalyst;

bending means for bending the exhaust path to provide the exhaust path with a curve;

partition means for dividing the exhaust path into first and second exhaust passages coextending along the length of the exhaust path, the partition means equalizing the first and second exhaust passages at the curve; and a sensor projecting into both of the first and second exhaust passages at the curve through the partition means.

14. The exhaust arrangement as claimed in claim 13, wherein the curve comprises an inner curve portion and an outer curve portion extending longer than the inner curve portion, the sensor being disposed at the outer curve portion.

15. The exhaust arrangement as claimed in claim 14, wherein the partition means is substantially parallel to a rolling axis of the engine about which the engine is rollable.

16. The exhaust arrangement as claimed in claim 14, wherein the curve comprises a plurality of curves, the sensor being disposed at the outer curve portion of one of the plurality of curves.

17. The exhaust arrangement as claimed in claim 16, wherein the partition means comprises upstream and downstream partitions separated from each other with a space, and a spherical joint disposed between the upstream and downstream partitions.

18. The exhaust arrangement as claimed in claim 16, wherein the passage means defines an upstream end of the exhaust path, the upstream end being located at a position rearward offset from substantially a central portion of a width of the engine which extends in a direction of the row of the cylinders.

19. An exhaust arrangement for a multi-cylinder internal combustion engine of a vehicle, the engine including a row of cylinders, the exhaust arrangement comprising:

an exhaust manifold including a branch portion including a plurality of branch pipes corresponding to the cylinders;

a catalyst disposed downstream of the exhaust manifold;

an exhaust pipe connecting the exhaust manifold to the catalyst, the exhaust pipe defining an exhaust path, the exhaust pipe having a longitudinal axis;

a bend formed in the exhaust pipe, the bend including a plane in which the longitudinal axis of the exhaust pipe lies, the bend including an inner curving periphery and an outer curving periphery extending longer than the inner curving periphery;

a partition dividing the exhaust path into first and second exhaust passages, the partition extending in the bend in alignment with the plane; and an oxygen sensor disposed at the outer curving periphery of the bend in alignment with the partition, the oxygen sensor projecting into both of the first and second exhaust passages through a periphery of the partition.

20. The exhaust arrangement as claimed in claim 19, wherein the bend comprises a plurality of bends, the oxygen sensor being disposed at the outer curving periphery of one of the plurality of bends.

* * * * *